United States Patent Office 3,384,462
Patented May 21, 1968

3,384,462
PROCESS FOR PREPARING TETRAMERIC PHOSPHONITRILIC CHLORIDE
Ekkehard Fluck, Heidelberg, Germany, assignor to Olin Mathieson Chemical Corporation, a corporation of Virginia
No Drawing. Filed Mar. 18, 1964, Ser. No. 352,964
Claims priority, application Germany, Aug. 19, 1963, F 40,529
11 Claims. (Cl. 23—357)

ABSTRACT OF THE DISCLOSURE

Process for preparing pure tetrameric phosphonitrilic chloride by heating a mixture of an inert organic diluent, an iminodiphosphoric chloride and elementary phosphorus at 30° C. to 200° C. to form a reaction mixture containing by-product phosphorus trichloride, said tetramer and said diluent, fractionally distilling said reaction mixture to separate over-head said phosphorus trichloride, said diluent and finally said tetramer.

This invention relates to the prepartion of pure tetrameric phosphonitrilic chloride having the formula $$(PNCl_2)_4$$

It has long been known that by the reaction of phosphorus pentachloride with ammonia at elevated temperature, phosphonitrilic chlorides $(PNCl_2)_n$, of different degrees of polymerization ($n=3,4,5,6,7$) result. Individual polymers in which $n$ is a particular value have been separated from the mixtures by solvent extraction, fractional crystallization, fractional distillation, chromatography and other methods.

According to the present invention, the pure tetramer is obtained by (1) treating iminodiphosphoric chlorides of the formula $[Cl_3:N.PCl_3]$ X in which X is selected from the group consisting of chloride and hexachlorophosphate with elementary phosphorus and (2) distilling pure tetramer from the reaction mixture under reduced pressure.

The unexpected feature of this invention is that using the materials specified in (1), no trimer is formed and the lowest boiling component of the reacted mixture aside from diluent and by-product phosphorus trichloride is tetramer. It is readily fractionally distilled overhead from higher boiling polymers in the mixture and is thus obtained free from higher and lower polymers of $PNCl_2$.

The reactions proceed according to the following equations:

(a) $3n[Cl_3P:N.PCl_3]PCl_6 + 4nP \rightarrow$
$$3[-PCl_2:N-]_n + 10nPCl_3$$

(b) $3n[Cl_3P:N.PCl_3]Cl + 2nP \rightarrow$
$$3[-PCl_2:N-]_n + 5nPCl_3$$

where $n$ is 4 or larger. To avoid contamination of the product by starting material, the use of a stoichiometric excess of phosphorus is advantageous.

The process of the invention is carried out in an organic diluent which is inert under the reaction conditions, suitably chlorinated aliphatic hydrcarbons or aromatic hydrocarbons. Examples include tetrachloroethane, xylene, decahydronaphthalene and petroleum ether. Suitably the diluent is from half to 10 times the weight of the reactants. The temperatures lie between 30 and 200° C. preferably between 100 and 150° C. The process is usually carried out at atmospheric pressure but can be carried out under reduced pressure in order to separate the by-product phosphorus trichloride from the reaction mixture.

Red phosphorus is the preferred form of elementary phosphorus because it is cheaper and easier to handle. Yellow phosphorus is also suitable.

After reaction is complete, usually in 0.5 to 5 hours at the elevated temperature, the reaction mixture is freed from unreacted phosphorus, for example, by filtration and the residue is distilled under reduced pressure. After a forerun of phosphorus trichloride, the tetrameric phosphonitrilic chloride distills over. In the residue remains higher polymers of phosphonitrilic chloride.

The starting material $P_3NCl_{12}=[Cl_3P:N.PCl_3]PCl_6$ can be prepared by the reaction of phosphorus pentachloride with ammonium chloride in a polar solvent, for example, nitrobenzene as reaction medium. See M. Becke-Goehring, Ber., 94 1591 (1961). The starting material $P_2NCl_7$ having the formula $[Cl_3P:N.PCl_3]Cl$ can be prepared by the chlorination of $P_2NSCl_5$ in the petroleum ether at 0° C. See M. Becke-Goehring et al., Z. anorg. allgem. Chem., 325, 287–301 (1963).

Example I

Iminohexachlorodiphosphoric hexachlorophosphate (533 grams; 1 mole) was mixed with 300 ml. of tetrachloroethane in a 1-liter 3-necked flask fitted with a stirrer and a reflux condenser. To the stirred suspension was added 42 grams (1.35 gram atoms) of red phosphorus in small portions. A gently exothermic reaction set in. After the addition of the red phosphorus was complete, the reaction mixture was warmed in an oil bath for one hour to 130° C. and the phosphorus trichloride formed was distilled off. Finally the hot reaction mixture was filtered through a glass frit and freed from a small quantity of unreacted red phosphorus. The tetrachloroethane was distilled from the filtrate in a rotary evaporator. There remained phosphonitrilic chloride of which about 20% was distilled out in the form of the tetramer. Boiling point 185–193° C. at 13 mm. Melting point 121–123° C.

Example II

Iminohexachlorodiphosphoric chloride (324.5 grams; 1 mole) was mixed with 250 ml. of tetrachloroethane in a 1-liter 3-necked flask fitted with a stirrer and a reflux condenser. To the stirred suspension was added 21 (0.68 gram atom) of red phosphorus in small portions. The subsequent procedure was as described in Example I. From the phosphonitrilic chloride residue was distilled out about 20% in the form of tetramer.

What is claimed is:

1. Process for preparing tetrameric phosphonitrilic chloride substantially free from lower and higher polymeric phosphonitrilic chlorides, by heating a mixture of an inert organic diluent, an iminodiphosphoric chloride having the formula $[Cl_3P:N.PCl_3]$ X in which X is selected from the group consisting of chloride ion and hexachlorophosphate ion and a stoichiometric excess of elementary phosphorus for 0.5 to 5 hours at a reaction temperature of 30 to 200° C. to form a reaction mixture containing by-product phosphorus trichloride, said tetramer and said diluent, fractionally distilling said reaction mixture to separate overhead said phosphorus trichloride, said diluent and finally said tetramer.

2. Process of claim 1 in which said diluent is selected from the class consisting of aliphatic and aromatic hydrocarbons and halohydrocarbons.

3. Process of claim 2 in which said diluent boils between 100 and 200° C.

4. Process of claim 3 in which said diluent is tetrachloroethane.

5. Process of claim 1 in which the amount of said diluent is from one-half to 10 times the weight of said iminodiphosphoric chloride.

6. Process of claim 1 in which said elementary phosphorus is red phosphorus.

7. Process of claim 1 in which said iminodiphosphoric chloride is $[Cl_3P:N.PCl_3]Cl$.

8. Process of claim 1 in which said iminodiphosphoric chloride is $[Cl_3P:N.PCl_3]PCl_6$.

9. Process of claim 7 in which the ratio of gram moles of said $[Cl_3P:N.PCl_3]Cl$ to gram atoms of phosphorus is substantially 3:2.

10. Process of claim 8 in which the ratio of gram moles of $[Cl_3P:N.PCl_3]PCl_6$ to gram atoms of phosphorus is substantially 3:4.

11. Process of claim 1 in which said reaction temperature is 100 to 150° C.

References Cited

UNITED STATES PATENTS 2,975,028  3/1961  Barth-Wehrenalp et al.  23—357

FOREIGN PATENTS 312,685  2/1930  Great Britain.

OTHER REFERENCES

Glemser et al.—"Naturwissenschaften," vol. 48, p. 25 (1961).

Mellor—"Comprehensive Treatise On Inorganic and Theoretical Chemistry," 1928, vol. 8, pp., 722, 1014.

MILTON WEISSMAN, *Primary Examiner.*